US010609671B2

United States Patent
Xu et al.

(10) Patent No.: US 10,609,671 B2
(45) Date of Patent: Mar. 31, 2020

(54) SYSTEM AND METHOD FOR POSITIONING A GATEWAY OF AN ARCHITECTURE

(71) Applicant: BEIJING DIDI INFINITY TECHNOLOGY AND DEVELOPMENT CO., LTD., Beijing (CN)

(72) Inventors: Hailiang Xu, Beijing (CN); Weihuan Shu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/978,653

(22) Filed: May 14, 2018

(65) Prior Publication Data

US 2018/0368095 A1 Dec. 20, 2018

Related U.S. Application Data

(63) Continuation of application No. PCT/CN2017/089229, filed on Jun. 20, 2017.

(51) Int. Cl.
| | |
|---|---|
| *H04W 64/00* | (2009.01) |
| *H04W 8/02* | (2009.01) |
| *H04W 4/02* | (2018.01) |
| *H04W 88/16* | (2009.01) |
| *H04W 48/18* | (2009.01) |

(52) U.S. Cl.
CPC ............ *H04W 64/00* (2013.01); *H04W 4/02* (2013.01); *H04W 8/02* (2013.01); *H04W 48/18* (2013.01); *H04W 88/16* (2013.01)

(58) Field of Classification Search
CPC ......... H04W 64/00; H04W 4/02; H04W 8/02; H04W 88/16
USPC .......................................... 455/456.1–456.06
See application file for complete search history.

(56) References Cited

U.S. PATENT DOCUMENTS

| | | | |
|---|---|---|---|
| 2013/0035110 A1 | 2/2013 | Sridhara et al. | |
| 2016/0007318 A1 | 1/2016 | Onozawa et al. | |
| 2016/0061607 A1* | 3/2016 | Yang ....................... | G01C 21/32 701/468 |
| 2016/0080911 A1 | 3/2016 | Kay et al. | |
| 2018/0033112 A1 | 2/2018 | Wu et al. | |
| 2018/0172441 A1* | 6/2018 | Hoque et al. .......... | G01B 21/00 |

FOREIGN PATENT DOCUMENTS

CN 1595465 A 3/2005

OTHER PUBLICATIONS

International Search Report in PCT/CN2017/089229 dated Mar. 26, 2018, 5 pages.
Written Opinion in PCT/CN2017/089229 dated Mar. 26, 2018, 4 pages.

* cited by examiner

*Primary Examiner* — Joshua L Schwartz
(74) *Attorney, Agent, or Firm* — Metis IP LLC

(57) ABSTRACT

Embodiments of the disclosure provide systems and methods for positioning a gateway of an architecture. The method may include determining a trajectory of a mobile device based on motion data acquired by the mobile device and a movement model, acquiring a first end position of the trajectory of the mobile device, detecting that the mobile device enters or exits the architecture, and determining a second end position of the trajectory upon the detection as the position of the gateway.

16 Claims, 7 Drawing Sheets

US 10,609,671 B2

SYSTEM AND METHOD FOR POSITIONING A GATEWAY OF AN ARCHITECTURE

CROSS-REFERENCE TO RELATED APPLICATIONS

This application is a continuation of International Application No. PCT/CN2017/089299, filed on Jun. 20, 2017, the contents of which are incorporated herein in its entirety by reference.

TECHNICAL FIELD

The present disclosure relates to positioning techniques, and more particularly, to systems and methods for positioning a gateway of an architecture.

BACKGROUND

It is important to accurately locate a gateway of an architecture, such as a house, a building, a parking garage, or any other structures. For example, to generate a layout map of the architecture, the gateway is an origin point for all routes within the architecture. Furthermore, the gateway position should be used as the end point of a navigation route if the destination is a large architecture located at crossroads.

Conventionally, the gateway of an architecture is positioned manually. For example, a position of a positioning device may be determined, and manually calibrated to be assigned as the position of the gateway of the architecture. It is not only time-consuming to position gateways of a huge number of architectures, but also expensive to hire technicians to perform the positioning manually.

As people carrying mobile devices (e.g., smart phones, tablets, smart watches, or the like) walk in or out of architectures, it is possible to position a gateway of an architecture by collecting position data and motion data of the mobile devices. However, the position data of a smart device is heavily relied on Global Positioning System (GPS) signals, which can only be received by the mobile device if a GPS positioning module of the mobile device is active.

Embodiments of the disclosure provide improved systems and methods for positioning a gateway of an architecture even when the GPS positioning module is turned off or the GPS signals are too weak for positioning.

SUMMARY

An aspect of the disclosure provides a method for positioning a gateway of an architecture. The method may include determining a trajectory of a mobile device outside the architecture based on motion data acquired by the mobile device and a movement model; acquiring, by a positioning device, a first end position of the trajectory of the mobile device; detecting that the mobile device enters or exits the architecture; and determining a second end position of the trajectory upon the detection as the position of the gateway.

Another aspect of the disclosure provides a system for positioning a gateway of an architecture. The system may include a memory configured to store a movement model; and a processor configured to determine a trajectory of a mobile device outside the architecture based on motion data acquired by the mobile device and a movement model; acquire a first end position of the trajectory of the mobile device; detect that the mobile device enters or exits the architecture; and determine a second end position of the trajectory upon the detection as the position of the gateway.

Yet another aspect of the disclosure provides a non-transitory computer-readable medium. The non-transitory computer-readable medium stores a set of instructions, when executed by at least one processor of a positioning system, cause the positioning system to perform a method for positioning a gateway of an architecture, the method comprising: determining a trajectory of a mobile device based on motion data acquired by the mobile device and a movement model; acquiring a first end position of the trajectory of the mobile device; detecting that the mobile device enters or exits the architecture; and determining a second end position of the trajectory upon the detection as the position of the gateway.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
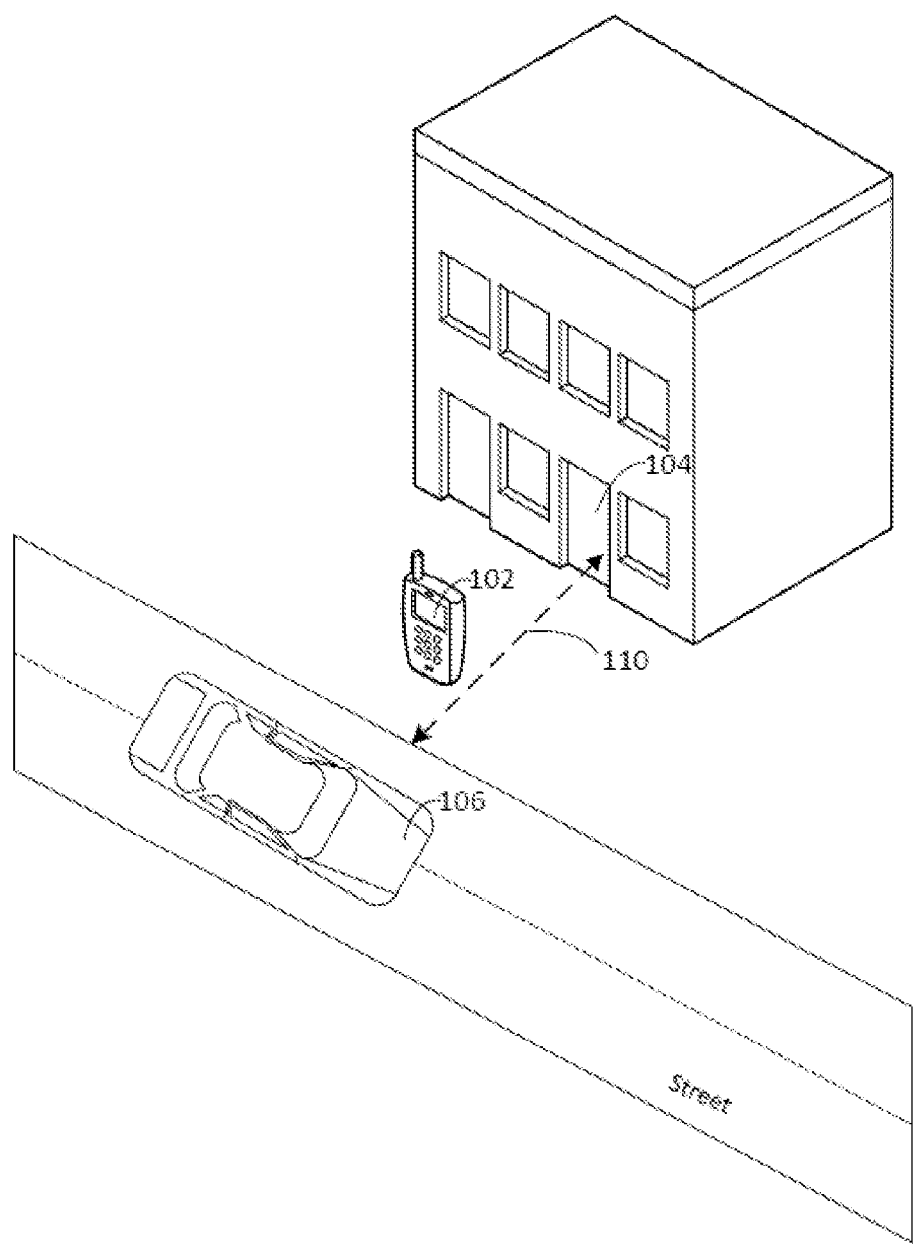
FIG. 1 is a schematic diagram illustrating exemplary relations among a terminal device, a gateway, and a vehicle, according to some embodiments of the disclosure.

FIG. 1 is a schematic diagram illustrating exemplary relations among a terminal device, a gateway, and a vehicle, according to some embodiments of the disclosure.

Generally, a vehicle driver's terminal device has its GPS positioning module turned on for GPS navigation. For example, when a driver installs an online-hailing platform application (e.g., DiDi app) on his/her terminal device, the application turns on the GPS positioning module by default, so that the position of the corresponding vehicle may be uploaded to a server of an online-hailing platform system. Similarly, when a user starts a trip, the start position of the trip will be uploaded to the server, and when a user finishes a trip, the end position of the trip also will be uploaded to the server. That is, the start position and the end position of a user's trip may be acquired by the online-hailing platform system.

Oftentimes, a user may request a vehicle (e.g., a taxi or a private car) for a trip using the online-hailing platform on a mobile device (e.g., a user device) when the user is still within an architecture (e.g., an office building, a shopping mall, a restaurant, a residential house or apartment building, or the like). The user carrying the mobile device may walk through an exit of the architecture to a ride pick-up position, and wait for the vehicle. Similarly, after a trip is finished, the user carrying the mobile device may leave the vehicle and walk into the architecture through an entrance of the architecture. Therefore, the user creates a trajectory (i.e., a trajectory of the mobile device) between the entrance/exit and the vehicle.

FIG. 1 shows a trajectory 110 of a mobile device 102 between a gateway 104 (an entrance or an exit) and a vehicle 106. When trajectory 110 is a trajectory toward gateway 104 (i.e., the entrance) of an architecture, a position of vehicle 106 is a start position of trajectory 110 and a position of gateway 104 is an end position of trajectory 110. Similarly, when trajectory 110 is a trajectory leaving gateway 104 (i.e., the exit) of the architecture, the position of vehicle 106 is an end position of trajectory 110 and the position of gateway 104 is a start position of trajectory 110.

Thus, given the position of vehicle 106 and trajectory 110, it is possible to determine the position of gateway 104 based on whether mobile device 102 is moving toward gateway 104 or leaving from gateway 104.

Figure 2:
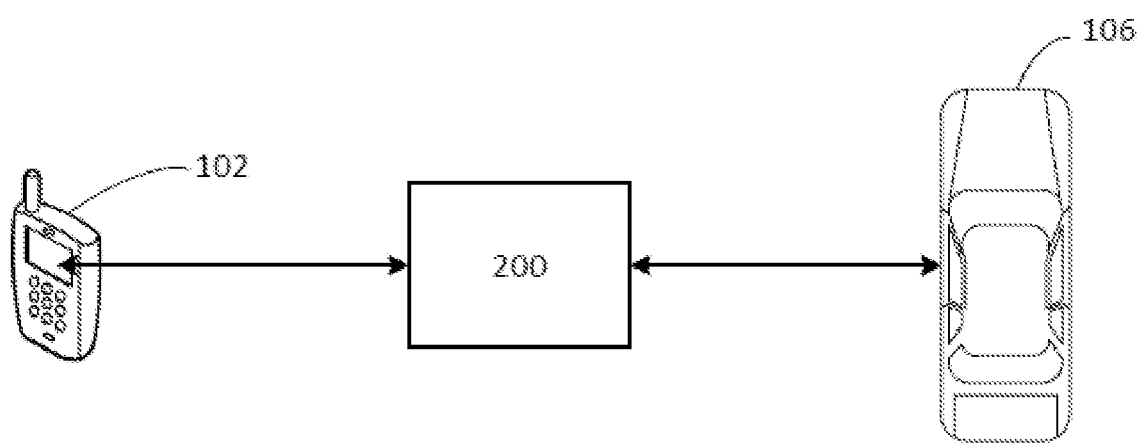
FIG. 2 illustrates an exemplary system for positioning a gateway of an architecture, according to some embodiments of the disclosure.

FIG. 2 illustrates an exemplary system 200 for positioning a gateway of an architecture, according to some embodiments of the disclosure.

System 200 may be a general server or a proprietary device in communication with both mobile device 102 and vehicle 106.

Mobile device 102 may include any smart device, such as a smart phone, a laptop, a tablet, a smart watch, or the like. Consistent with embodiments of the disclosure, mobile device 102 may include a plurality of sensors and/or signal receivers for acquiring sensing signals for determining a trajectory of mobile device 102.

The sensors may include a barometric sensor, a temperature sensor, a light sensor, or the like. The sensors may further include motion sensors, such as a magnetometer, a gyroscope, a gravity sensor, an acceleration sensor, or the like, and the motion sensors may be configured to receive motion data, such as a magnetic field strength, a direction, a gravity value, an acceleration value, or the like of mobile device 102.

The signal receiver may be configured to receive Wireless Fidelity (WiFi) signals, Bluetooth signals, base station signals, or the like. The base station signals may further include Global System for Mobile Communications (GSM) signals, Code Division Multiple Access (CDMA) signals, Wideband Code Division Multiple Access (WCDMA) signals, Long-Term Evolution (LTE) signals, or the like. Therefore, the sensing signals may include at least one of barometric pressure, temperature, light intensity, a magnetic field value, a direction, a gravity value, an acceleration value, WiFi signals, base station signals, or the like.

Vehicle 106 may upload trip information to system 200. For example, the trip information may include an identity of a user, positions of vehicle 106, or the like. The identity of the user may include information of the user account, which is logged in on mobile device 102 of the user. Positions of vehicle 106 may include any positions during the trip, such as an origin point of a trip, a destination point of the trip, or the like. Vehicle 106 may acquire the above trip information by a driver terminal device (not shown) having the online-hailing platform application (e.g., DiDi app) or a built-in device (not shown). The driver terminal device or the built-in device may include a GPS positioning module for determining a position of vehicle 106. Therefore, when the trip is still ongoing, mobile device 102 may be located based on the position of vehicle 106 even if the GPS positioning module of mobile device 102 is inactive or having weak signals.

Figure 3:
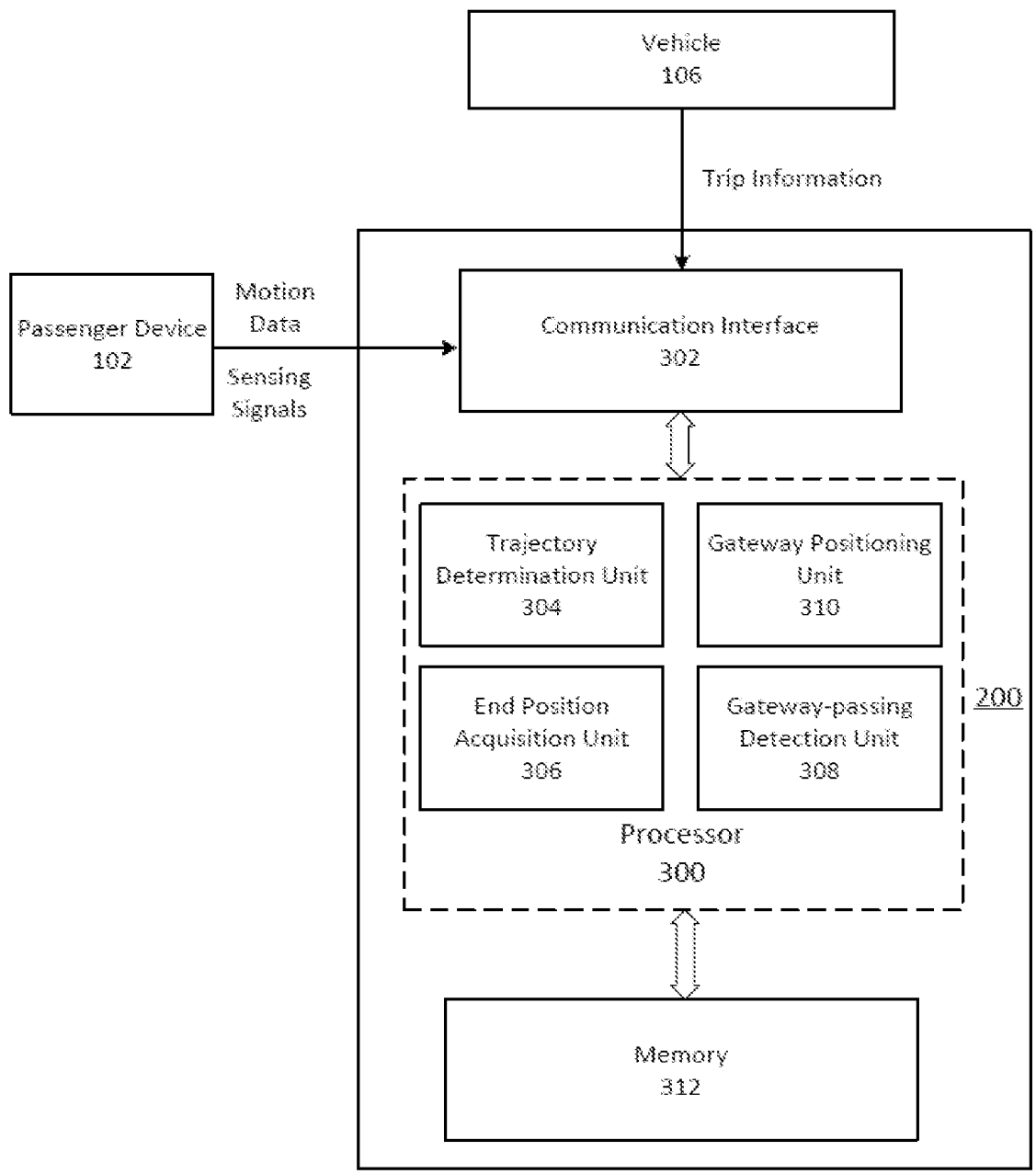
FIG. 3 is a block diagram of an exemplary system for positioning a gateway of an architecture, according to some embodiments of the disclosure.

Consistent with embodiments of the disclosure, system 200 may position a gateway of an architecture based on the motion data and sensing signals of mobile device 102 and the trip information of vehicle 106. FIG. 3 is a block diagram of an exemplary system for positioning a gateway of an architecture, according to some embodiments of the disclosure.

As shown in FIG. 3, system 200 may include a processor 300, a communication interface 302, and a memory 312. Processor 300 may further include multiple functional modules, such as a trajectory determination unit 304, an end position acquisition unit 306, a gateway-passing detection unit 308, and a gateway positioning unit 310. These modules (and any corresponding sub-modules or sub-units) can be functional hardware units (e.g., portions of an integrated circuit) of processor 300 designed for use with other components or a part of a program (stored on a computer-readable medium) that, when executed by processor 300, performs one or more functions. Although FIG. 3 shows units 304-310 all within one processor 300, it is contemplated that these units may be distributed among multiple processors located near or remotely with each other. System 200 may be implemented in the cloud, on terminal device 102, or a separate computer/server.

Communication interface 302 may be in communication with mobile device 102 and vehicle 106, and configured to receive the motion data and sensing signals of mobile device 102 and trip information of vehicle 106.

Consistent with embodiments of the disclosure, memory 312 may be configured to store the above motion data, sensing signals, trip information, or the like. Memory 312 may be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

As discussed above, in order to position a gateway of an architecture, trajectory 110 of mobile device 102 and the positions of vehicle 106 may be acquired, and whether mobile device 102 is entering or exiting the architecture may be determined.

Trajectory determination unit 304 may determine trajectory 110 of mobile device 102 based on motion data acquired by mobile device and a movement model. The determining process may include two stages. In a first stage, also referred to as the "training stage," trajectory determination unit 304 may generate and train a movement model using data associated with mobile device 102; and in a second stage, also referred to as the "determining stage," trajectory determination unit 304 may apply the trained movement model to determine trajectory 110 of a mobile device, which may be mobile device 102 or another mobile device carried by the same user. It is contemplated that, the trained movement model may be applied to a mobile device other than mobile device 102 in the training stage, as long as the mobile device is placed at a same place on the user where mobile device 102 was placed.

In some embodiments, the movement model may be generated during the training stage by a Pedestrian Dead Reckoning (PDR) method. The PDR method may train the movement model based on training motion data and a corresponding trajectory of mobile device 102.

For example, when the training begins, the user may be required to turn on the GPS positioning module of mobile device 102 by an application (e.g., the DiDi app) installed on mobile device 102, and keep mobile device 102 with the user. For example, mobile device 102 may be placed anywhere on the user, such as in his pocket, attached to his belt, or in/with another item carried by the user, such as a purse, an armband, or the like.

The GPS positioning module may receive GPS signals and generate a GPS-determined trajectory of mobile device 102 based on the received GPS signals. It is contemplated that, the GPS-determined trajectory is merely an example of the determined trajectory. As long as the trajectory can be accurate enough for training, any method may be used for generating the determined trajectories. In some embodiments, an indoor positioning method may also generate the determined trajectory.

Figure 4:
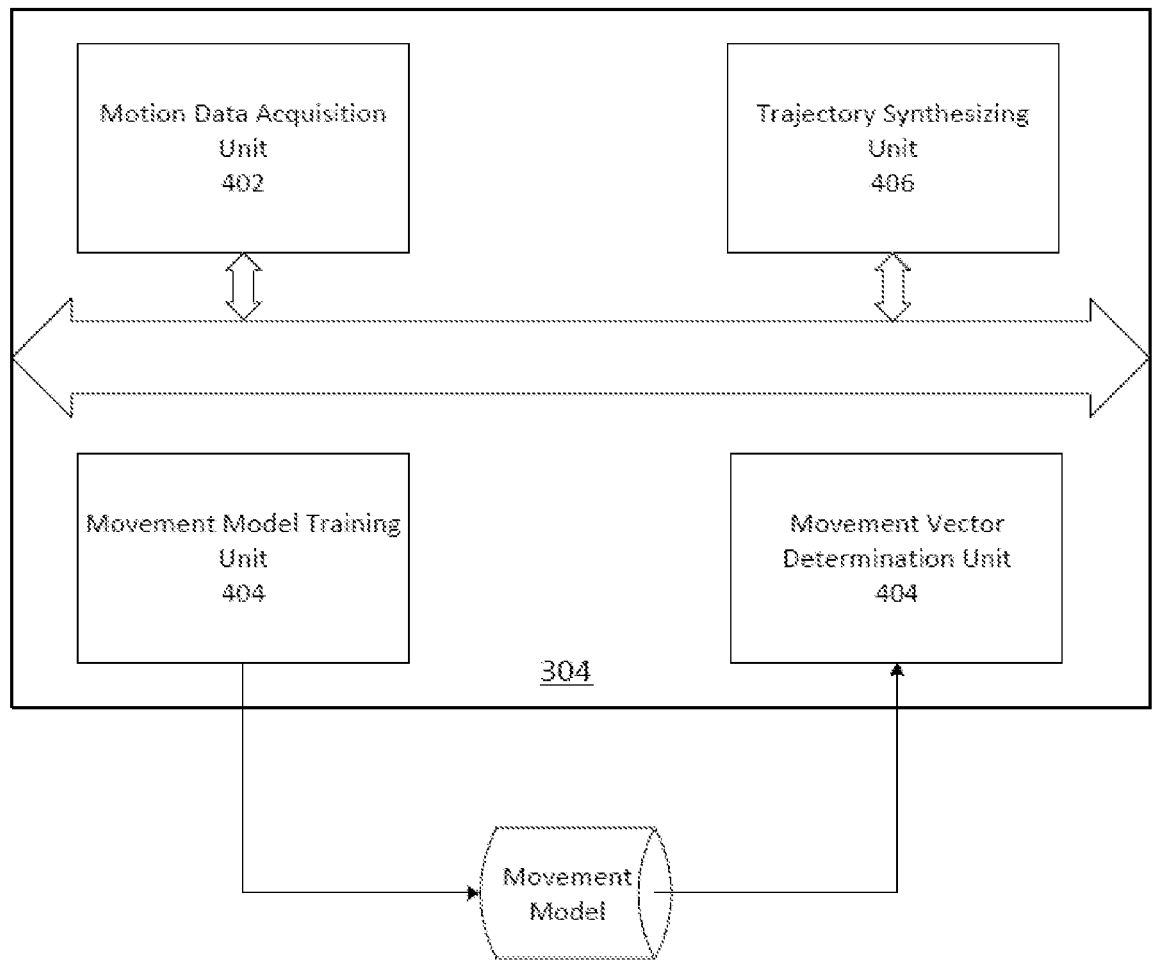
FIG. 4 is a block diagram of an exemplary trajectory determination unit, according to some embodiments of the disclosure.

The application may further require the user to walk or jog for a predetermined distance, so that the training motion data may be collected by motion sensors and the corresponding trajectory of mobile device 102 may be determined by the GPS positioning module. As a user generally moves with a certain pattern, the training motion data and the corresponding trajectory of mobile device 102 are associated. Given enough training motion data and corresponding trajectories, trajectory determination unit 304 may generate the movement model using a suitable machine learning method. The training motion data is essentially the same as the motion data discussed above, description of which is omitted herein for clarity. The training process is further described below with reference to FIG. 4. FIG. 4 is a block diagram of an exemplary trajectory determination unit, according to some embodiments of the disclosure.

As shown in FIG. 4, trajectory determination unit 304 may include a motion data acquisition unit 402, a movement model training unit 404, a movement vector determination unit 404, and a trajectory synthesizing unit 406.

In some embodiments, mobile device 102 may collect the training motion data and the corresponding trajectory during the training stage at a predetermined frequency, e.g., five times per second, and motion data acquisition unit 402 may receive the collected training motion data and the determined trajectories. In some embodiments, a data collection window, such as three seconds, may be defined as for collecting the training motion data and trajectory. Accordingly, in the example above, 15 sets of the training motion data and the corresponding trajectories are collected by mobile device 102 for each window. It is contemplated that any suitable frequency (N times per second) and window (M seconds) may be used for the data collection, resulting in N×M sets of training data. Motion data acquisition unit 402 may receive a plurality sets of the training motion data and the corresponding trajectories from mobile device 102.

Then, movement model training unit 404 may then train the movement model based on the received the training motion data and the corresponding trajectories.

For example, movement model training unit 404 may perform statistical analysis on each set of the training motion data and the corresponding trajectory, so as to extract feature vectors and supervised signals for training the movement model.

Figure 5:
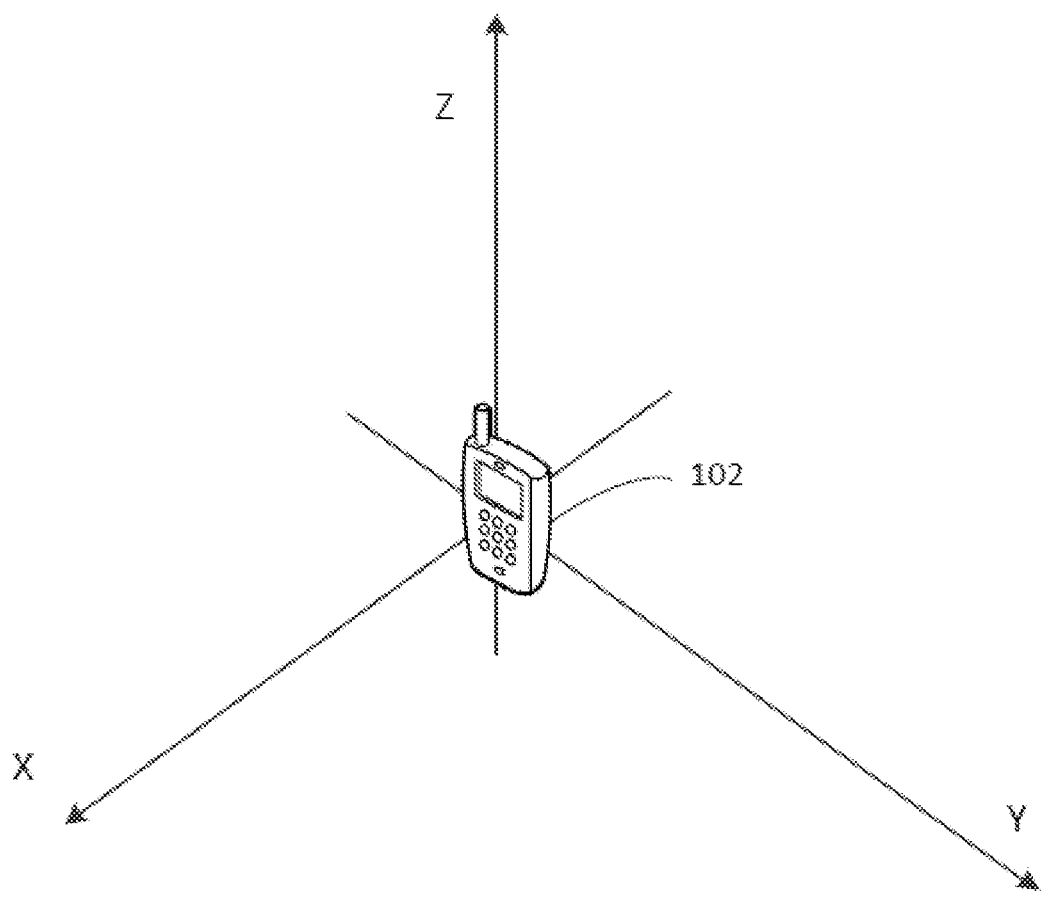
FIG. 5 illustrates an exemplary coordinate system for a mobile device, according to some embodiments of the disclosure.

In some embodiments, the feature vectors may include statistic results in each axis of a coordinate system for mobile device 102. FIG. 5 illustrates an exemplary coordinate system 500 for mobile device 102, according to some embodiments of the disclosure.

As shown in FIG. 5, coordinate system 500 may be a Cartesian coordinate system. Mobile device 102 may be assigned as an origin of coordinate system 500, a front direction of mobile device 102 may be assigned as an X axis, a left direction may be assigned as a Y axis, and an orthogonal direction of the X and Y axes may be assigned as a Z axis. It is contemplated that other coordinate systems may also be applied on mobile device 102.

Similar to the motion data, the training motion data may also at least include a magnetic field strength, a direction, a gravity value, an acceleration value, or the like of mobile device 102. By perform the statistical analysis, movement model training unit 404 may generate an average value, a variance, and a histogram of acceleration values in each of the X, Y, and Z axes. In an exemplary histogram, there may be eight bins between a maximum acceleration value and a minimum acceleration value, and each bin may contain a certain number of acceleration values. It is contemplated that any suitable number of bins may be contained in the histogram. The number of acceleration values within a bin may be determined as a bin value for the bin. Thus, for each direction, movement model training unit 404 generates one average value, one variance, and eight bin values (i.e., 10 components in total) for each axis, and therefore 30 components may be generated for three axes. Similarly, movement model training unit 404 also generates 30 components in total based on the magnetic field values.

Movement model training unit 404 further respectively calculates the numbers of acceleration values in the X axis being greater than, equal to, and less than acceleration values in the Y axis, the numbers of acceleration values in the X axis being greater than, equal to, and less than acceleration values in the Z axis, and the numbers of acceleration values in the Y axis being greater than, equal to, and less than acceleration values in the Z axis. Thus, movement model training unit 404 generates three numbers for each axis, and nine components in total for the feature vector based on the acceleration values. Similarly, movement model training unit 404 respectively generates nine components based on the magnetic field values.

Movement model training unit 404 further respectively generates an average value, a variance, and a histogram (e.g., having 8 bins) of acceleration value differences between the X and Y axes, the X and Z axes, and the Y and Z axes. That is, movement model training unit 404 may generate 10 components for each pair of the X and Y axes, the X and Z axes, and the Y and Z axes, and 30 components in total based on the acceleration value differences. Similarly, movement model training unit 404 generates an average value, a variance, and a histogram of magnetic field value differences between the X and Y axes, the X and Z axes, and the Y and Z axes. That is, movement model training unit 404 may generate another 30 components in total based on magnetic field strength differences. Thus, movement model training unit 404 generates 60 components for the feature vector based on the acceleration value differences and magnetic field strength differences.

In total, as described above, a feature vector having 138 components may be generated by movement model training unit 404 for each window.

It is contemplated that, depending on the algorithm for processing the training motion data, more or less components may be generated by movement model training unit 404 for each window. And more motion data, other than the acceleration value and magnetic field strength, may be used for generating components of the feature vectors.

For the same window above, the corresponding trajectory of mobile device 102 may include a first position (x1, y1) when the window begins and a second position (x2, y2) when the window ends, wherein x1 and x2 indicate longitude values of the first and second positions, and y1 and y2 indicate latitude values of the first and second positions. Therefore, movement model training unit 404 may generate a transition vector V=(x1, y1)–(x2, y2), pointing from the first position to the second position, and the transition vector may be assigned as supervised signals for training the movement model.

Movement model training unit 404 may generate a plurality sets of feature vectors and supervised signals based the collected motion data and the corresponding trajectories.

Movement model training unit 404 may further train the movement model based on the plurality sets of feature vectors and supervised signals. The training process may be performed according to, for example, a Random Forest algorithm. In some embodiments, in the Random Forest algorithm, each random forest may include 50 random trees, the depth of each random tree is 25, a minimum number of samples at a leaf is 30, for example. The parameters (e.g., the number of random trees, the depth of each random tree, the minimum number of samples, or the like) for Random Forest algorithm may be adjusted during practice.

The trained movement model may be stored in memory 312. It is contemplated that, because the user may carry mobile device 102 in many ways, such as holding mobile device 102 in hands, putting mobile device 102 in a pocket, attaching mobile device 102 to an arm of the user, or the like, trajectory determination unit 304 may generate a movement model including a plurality of sub-models, and each of the sub-models corresponds to a place on a user where mobile device 102 is carried.

After the movement model has been trained, in the determining stage, trajectory determination unit 304 may determine a trajectory of mobile device 102 based on motion data acquired by mobile device 102 and the movement model. Consistent with embodiments of the disclosure, motion data acquisition unit 402 of trajectory determination unit 304 may further receive the motion data acquired by mobile device 102, in the determining stage. For example, motion data acquisition unit 402 may send out an instruction to mobile device 102 for collecting the motion data, upon a predetermined event. In one embodiment, upon a user requesting a taxi using, for example, the DiDi app, motion data acquisition unit 402 sends to mobile device 102 the instruction for collecting the motion data. It is contemplated that, when the user requests the taxi service, the user may be still in his/her office, and may start to walk to a pick-up position after the request has been confirmed. In this case, the motion data may be used for determining an exit of the architecture, as the user needs to walk out of the architecture through the gateway. In another embodiment, when a user finishes a trip by, for example, the DiDi app, motion data acquisition unit 402 sends to mobile device 102 the instruction for collecting the training motion data. It is contemplated that, after the user finishes the trip, it is possible that the user may walk into an architecture through the gateway. In this case, the motion data may be used for determining an entrance of the architecture.

It is contemplated that, when the movement model includes a plurality of sub-models, trajectory determination unit 304 may further select a sub-model based on the motion data, and determine the movement vectors using the sub-model based on the motion data.

Because the movement model is trained based on a feature vector and supervised signals within a data collection window, movement vector determination unit 404 of trajectory determination unit 304 may determine a movement vector in a data collection window using the movement model. Given a plurality of sets of feature vectors and supervised signals calculated from motion data, a plurality of movement vectors may be generated. As explained above, mobile device 102 may collect the training motion data and a corresponding trajectory at a predetermined frequency, therefore movement vector determination unit 404 may generate one movement vector periodically. For example, if the data collection occurs five time per second, the movement vector can be generated every 200 milliseconds (ms).

Then, trajectory synthesizing unit 406 of trajectory determination unit 304 may determine the trajectory of mobile device 102 by synthesizing the movement vectors. In one embodiment, the movement vectors may be connected sequentially to generate the trajectory. In another embodiment, the movement vectors may be assigned different weights. It is contemplated that, an actual movement of mobile device 102 is more likely to resemble a recently generated movement vector $V_0$, as opposed to a movement vector generated a while ago. Thus, the movement vectors may be assigned different weights based on when the movement vectors are generated. For example, a currently generated movement vector $V_0$ may be assigned with a weight of "1", a movement vector $V_1$ generated a period earlier than the currently generated movement vector may be assigned with a weight of "0.9", a movement vector $V_2$ generated a period earlier than movement vector $V_1$ may be assigned with a weight of "0.8", and a movement vector $V_n$ generated a period earlier than movement vector $V_{n-1}$ may be assigned with a weight of 1-0.1×n. In some embodiments, n=9, and a weighted average vector may be generated by synthesizing the generated vectors $V_0$-$V_9$ based on the above weights, so as to further generate the trajectory.

It is contemplated that, the trajectory generated above is a synthesized vector, indicating a movement from a first end position (i.e., a start position) to a second end position (i.e., a terminal position).

With reference back to FIG. 3, end position acquisition unit 306 may acquire a first end position of the trajectory of mobile device 102. As discussed above, the trip information of vehicle 106 may include the identity of the user, which is associated with mobile device 102 of the user. Therefore, during the trip, positions of mobile device 102 may be identical to positions of vehicle 106. In a first example, when the user arrives at a destination point of a trip, the position of vehicle 106 may be assigned as the first end position, which is also the start position of the trajectory of mobile device 102. In a second example, after the user requests a vehicle service, when vehicle 106 picks up the user and starts a trip, the origin of the trip may be assigned as the first end position. That is, the first end position is an origin of the trip taken by a user carrying mobile device 102. As the user oftentimes requests the vehicle service within the architecture and leaves the architecture for the pick-up position (i.e., the origin of the trip) later, the origin of the trip is also a terminal position of a trajectory from the architecture to the pick-up position.

Furthermore, as the origin of the trip is oftentimes close to the architecture, the architecture may be identified based on the first end position.

It is contemplated that, the first end position in the first example is the start position of the trajectory, while the first end position in the second example, is the end position of the trajectory. Therefore, the first end position acquired by end position acquisition unit 306 can be either the start position or the end position of the trajectory.

Given the position of one end of the trajectory, the gateway may be positioned by locating the gateway on the trajectory.

Gateway-passing detection unit 308 may detect that mobile device 102 enters or exits the architecture. When mobile device 102 is detected entering or exiting the gateway, a position of the gateway may be determined correspondingly. When mobile device 102 enters or exits the architecture, barometric pressure, temperature, light intensity may change. And the WiFi signals and the base station signals received by mobile device 102 may also change. For example, when mobile device 102 enters an architecture, mobile device 102 may be able to receive WiFi signals of a WiFi access point disposed within the architecture. Therefore, gateway-passing detection unit 308 may determine a reference value based on changes in sensing signals acquired by mobile device 102, and the sensing signals may at least include barometric pressure, temperature, light intensity, Wireless Fidelity (WiFi) signals, base station signals, or the like. That is, the reference value for determining whether mobile device 102 enters or exits the architecture is generated based on a plurality of sensing signals, rather than merely one signal. In some embodiments, the reference value indicates the amplitude of the changes of the sensing signals. Gateway-passing detection unit 308 further compares the reference value with a threshold value. The threshold may be predetermined and stored in memory 312. Then, gateway-passing detection unit 308 determines that the mobile device enters or exits the architecture when the reference value is greater than the threshold value.

In some embodiments, the second end position of the trajectory of mobile device 102 may be determined upon entering or exiting the architecture. Upon the detection, gateway positioning unit 310 may then determine the second end position of the trajectory as the position of the gateway.

Therefore, system 200 may automatically position a gateway of an architecture based on a trajectory of a mobile device of a user and positions of a vehicle that is associated with a trip request of the user, and thus system 200 is efficient and cost-effective.

Another aspect of the disclosure provides a method for positioning a gateway of an architecture.

Figure 6:
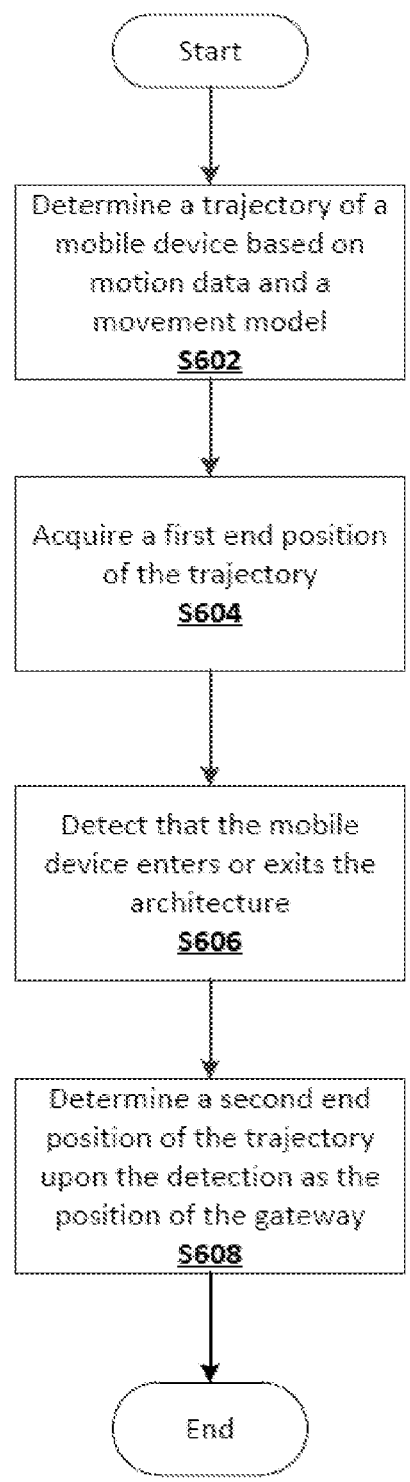
FIG. 6 is a flowchart of an exemplary method for positioning a gateway of an architecture, according to some embodiments of the disclosure.

FIG. 6 is a flowchart of an exemplary process 600 for positioning a gateway of an architecture, according to some embodiments of the disclosure. For example, process 600 may be implemented by system 200, and process 600 may include steps S602-S608 as below.

In step S602, system 200 may determine a trajectory of a mobile device based on motion data acquired by the mobile device and a movement model. The motion data may be a magnetic field strength, a direction, a gravity value, an acceleration value, or the like generated during the movement of the mobile device. A plurality of sensors, including a barometric sensor, a temperature sensor, a light sensor, or the like, may be used to generate the motion data. The movement model may be generated using machine learning in a training stage. For example, system 200 may train the movement model based on training motion data and the corresponding trajectory of the mobile device. The training motion data is essentially similar as the motion data, and may be acquired similarly from the mobile device. The corresponding trajectory of the mobile device may be determined by any suitable methods, as long as it is sufficiently accurate for the training process. In some embodiments, the corresponding trajectory may be determined based on the GPS signals received by the mobile device. That is, in the training stage, a GPS positioning module is required to be turned on in the training stage. The process for training the movement model has been discussed above in connection with FIG. 4.

It is contemplated that, the movement model may include a plurality of sub-models, and each of the sub-models corresponds to a place on a user where the mobile device is carried.

Figure 7:
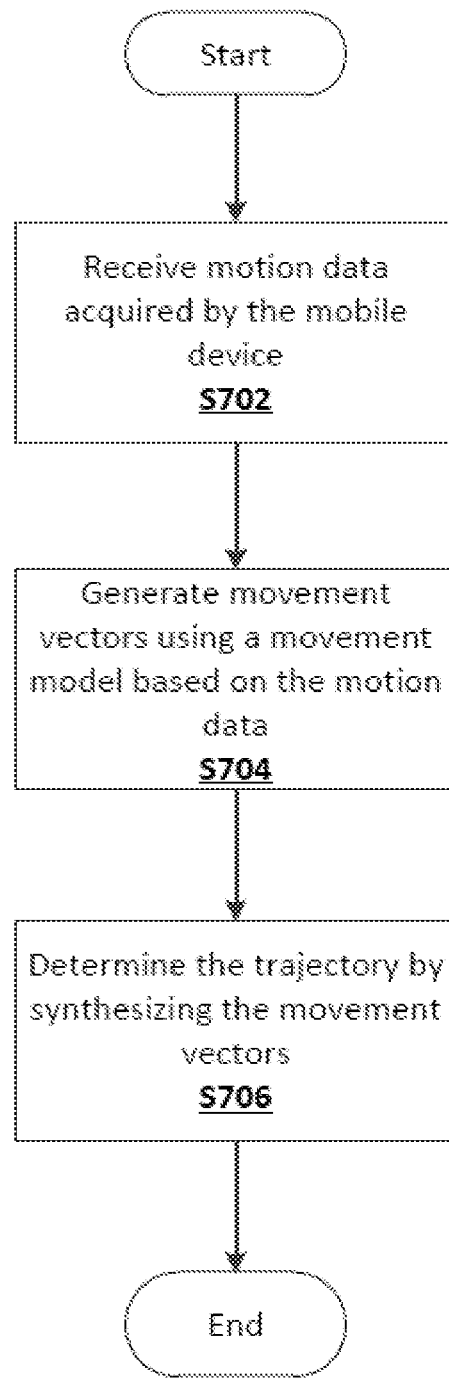
FIG. 7 illustrates a flowchart of an exemplary process for generating a trajectory of a mobile device, according to some embodiments of the disclosure.

Given the acquired motion data and the movement model, the trajectory of the mobile device may be generated even without receiving GPS signals. FIG. 7 is a flowchart of an exemplary process 700 for generating the trajectory of a mobile device, according to some embodiments of the disclosure. Process 700 may be also performed by system 200, and may include sub-steps S702-S706.

In sub-step S702, system 200 may receive the motion data acquired by the mobile device. In sub-step S704, system 200 may generate a plurality of movement vectors using a movement model based on the motion data. In sub-step S706, system 200 may determine the trajectory of the mobile device by synthesizing the movement vectors.

As discussed above, when the movement model includes a plurality of sub-models, system 200 may select a sub-model based on the motion data, and determine the movement vectors using the sub-model based on the motion data. For example, when a user puts the mobile device in the pocket, system 200 may first determine that the mobile device is kept in the pocket, and determine the movement vector using the sub-model for pocket. Thus, system 200 may determine the trajectory of the mobile device.

In step S604, system 200 may acquire a first end position of the trajectory of the mobile device, so that any position of the trajectory can be located based on the first end position and the trajectory itself in later steps.

Consistent with embodiments of the disclosure, system 200 uses positions of a vehicle based on a trip request associated with the vehicle and the mobile device, so as to acquire the first end position.

In a first example, when a user finishes a trip and leaves the vehicle, the position of the vehicle at the destination of the trip may be assigned as the first end position, which is the start position of a trajectory of the mobile device from the vehicle to the architecture. In a second example, after the user requests a vehicle service, when the vehicle picks up the user and starts a trip, an origin of the trip may be assigned as the first end position. As the user oftentimes requests the vehicle service within the architecture and leaves the architecture for the pick-up position later, the origin of the trip is also an end position of a trajectory from the architecture to the pick-up position.

Furthermore, as the origin of the trip is oftentimes close to the building, the architecture may be identified based on the first end position.

It is contemplated that, the first end position in the first example is the start position of the trajectory, while the first end position in the second example is the terminal position of the trajectory. Therefore, the first end position acquired in step S604 can be either the start position or the terminal position of the trajectory.

In step S606, system 200 may detect that the mobile device enters or exits the architecture. When the mobile device enters or exits the architecture, barometric pressure, temperature, light intensity may change. And the WiFi signals and the base station signals received by mobile device 102 also may change. For example, when mobile device 102 enters an architecture, mobile device 102 may be able to receive WiFi signals of a WiFi access point disposed within the architecture. Therefore, gateway-passing detection unit 308 may determine a reference value based on sensing signals acquired by the mobile device, and the sensing signals may include at least one of barometric pressure, temperature, light intensity, Wireless Fidelity (WiFi) signals, base station signals, or the like. That is, the reference value for determining whether the mobile device enters or exits the architecture is generated based on a plurality of sensing signals, rather than merely one signal. In some embodiments, the reference value indicates the amplitude of the changes of the sensing signals. System 200 further compares the reference value with a threshold value. The threshold may be predetermined and stored in a memory. Then, system 200 determines that the mobile device enters or exits the architecture when the reference value is greater than the threshold value.

In step S608, system 200 may determine a second end position of the trajectory upon the detection as the position of the gateway. Because system 200 detects the mobile device entering or exiting the architecture, a position on the trajectory upon detection may be determined as the second end position of the trajectory. The second end position of the trajectory may be further assigned as the position of the gateway.

Process 600 may automatically position a gateway of an architecture based on a trajectory of a mobile device of a user and positions of a vehicle that is associated with a trip request of the user, and thus process 600 is efficient and cost-effective.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed positioning system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A computer-implemented method for positioning a gateway of an architecture, comprising:
   acquiring motion data from a mobile device when the mobile device is being moved, wherein the mobile device comprises at least one motion sensor configured to detect the motion data that is being transmitted to a server comprising at least one processor;
   determining a trajectory of the mobile device based on the motion data and a movement model, wherein the movement model is obtained according to a machine learning method and comprises a plurality of sub-models, each of the plurality of sub-models corresponding to a place where the mobile device is carried;
   acquiring a first end position of the trajectory of the mobile device;
   detecting that the mobile device enters or exits the architecture; and
   determining the position of the gateway of the architecture by identifying a second end position of the trajectory upon the detection,
   wherein acquiring the first end position of the trajectory of the mobile device comprises:
      acquiring, from the mobile device, positioning information of an outdoor trip taken by a user associated with the mobile device; and
      identifying a destination of the outdoor trip as the first end position, wherein the mobile device subsequently enters the architecture.

2. The method of claim 1, further comprising:
   acquiring, from the mobile device, positioning information of a trip taken by a user associated with the mobile device;
   identifying an origin of the trip as the first end position, wherein the mobile device exits the architecture before the trip.

3. The method of claim 1, further comprising identifying the architecture based on the first end position.

4. The method of claim 1, wherein detecting that the mobile device enters or exits the architecture further includes:
   acquiring sensing signals with the mobile device, wherein the mobile device further comprises at least one signal receiver that receives the sensing signals;
   transmitting the sensing signals from the mobile device to the server;
   determining a reference value based on the sensing signals acquired by the mobile device;
   comparing the reference value with a threshold value; and
   determining that the mobile device enters or exits the architecture when the reference value is greater than the threshold value.

5. The method of claim 4, wherein the sensing signals include at least one of barometric pressure, temperature, light intensity, Wireless Fidelity (WiFi) signals, or base station signals.

6. The method of claim 1, wherein determining the trajectory of the mobile device further comprises:
   generating a plurality of movement vectors using the movement model based on the motion data; and
   determining the trajectory of the mobile device by synthesizing the plurality of movement vectors.

7. The method of claim 6, further comprising training the movement model using at least one set of training motion data and corresponding trajectory.

8. The method of claim 6, wherein generating the plurality of movement vectors includes:
   selecting a sub-model from the plurality of sub-models based on the motion data; and
   using the sub-model to generate the plurality of movement vectors based on the motion data.

9. A system for positioning a gateway of an architecture, comprising:
   a server comprising at least one processor, a memory, and a server communication interface that receives motion data acquired by a mobile device, the memory including a movement model, wherein the at least one processor is configured to:

determine a trajectory of the mobile device based on the motion data acquired by the mobile device and the movement model, wherein the movement model is obtained according to a machine learning method and comprises a plurality of sub-models, each of the plurality of sub-models corresponding to a place where the mobile device is carried;

acquire a first end position of the trajectory of the mobile device;

detect that the mobile device enters or exits the architecture; and determine the position of the gateway of the architecture by identifying a second end position of the trajectory upon the detection, wherein to acquire the first end position of the trajectory of the mobile device, the at least one processor is configured to:

acquire, from the mobile device, positioning information of an outdoor trip taken by a user associated with the mobile device; and identify a destination of the outdoor trip as the first end position, wherein the mobile device subsequently enters the architecture.

10. The system of claim 9, wherein to determine the first end position, the at least one processor is further configured to:

obtain, by the mobile device, positioning information of a trip taken by a user associated with the mobile device; and identify an origin of the trip as the first end position, wherein the mobile device exits the architecture before the trip.

11. The system of claim 9, wherein the at least one processor is further configured to identify the architecture based on the first end position.

12. The system of claim 9, wherein to detect that the mobile device enters or exits the architecture, the at least one processor is further configured to:

acquire sensing signals with the mobile device, wherein the mobile device further comprises at least one signal receiver that receives the sensing signals;

determine a reference value based on the sensing signals acquired by the mobile device;

compare the reference value with a threshold value; and determine that the mobile device enters or exits the architecture when the reference value is greater than the threshold value.

13. The system of claim 12, wherein the sensing signals include at least one of barometric pressure, temperature, light intensity, Wireless Fidelity (WiFi) signals, or base station signals.

14. The system of claim 9, wherein to determine the trajectory of the mobile device, the at least one processor is further configured to:

generate a plurality of movement vectors using the movement model based on the motion data; and determine the trajectory of the mobile device by synthesizing the plurality of movement vectors.

15. The system of claim 14, wherein the at least one processor is further configured to train the movement model using at least one set of training motion data and corresponding trajectory.

16. A non-transitory computer-readable medium that stores a set of instructions, when executed by at least one processor of a positioning system, cause the positioning system to perform a method for positioning a gateway of an architecture, the method comprising:

acquiring motion data with a mobile device when the mobile device is being moved, wherein the mobile device comprises at least one motion sensor configured to detect the motion data that is being transmitted to a server comprising at least one processor;

determining a trajectory of the mobile device based on the motion data acquired by the mobile device and a movement model, wherein the movement model is obtained according to a machine learning method and comprises a plurality of sub-models, each of the plurality of sub-models corresponding to a place where the mobile device is carried;

acquiring a first end position of the trajectory of the mobile device;

detecting that the mobile device enters or exits an architecture; and determining the position of the gate way of the architecture by identifying a second end position of the trajectory upon the detection, wherein acquiring the first end position of the trajectory of the mobile device comprises:

acquiring, from the mobile device, positioning information of an outdoor trip taken by a user associated with the mobile device; and identifying a destination of the outdoor trip as the first end position, wherein the mobile device subsequently enters the architecture.

* * * * *